United States Patent
Gao et al.

(10) Patent No.: US 11,162,848 B2
(45) Date of Patent: Nov. 2, 2021

(54) MOTION DETECTION SYSTEM AND METHOD OF A BUILDING AUTOMATION SYSTEM

(71) Applicant: enLighted, Inc., Sunnyvale, CA (US)

(72) Inventors: Jun Gao, Saratoga, CA (US); William Kerry Keal, San Jose, CA (US)

(73) Assignee: Enlighted, Inc., Santa Clara, CA (US)

( * ) Notice: Subject to any disclaimer, the term of this patent is extended or adjusted under 35 U.S.C. 154(b) by 85 days.

(21) Appl. No.: 16/779,219

(22) Filed: Jan. 31, 2020

(65) Prior Publication Data

US 2021/0239533 A1 Aug. 5, 2021

(51) Int. Cl.
*G01J 5/02* (2006.01)
*G01J 5/10* (2006.01)
*H04L 12/28* (2006.01)

(52) U.S. Cl.
CPC .......... *G01J 5/025* (2013.01); *G01J 5/10* (2013.01); *G01J 2005/106* (2013.01); *H04L 12/2803* (2013.01)

(58) Field of Classification Search
CPC ........ G01J 5/025; G01J 5/10; G01J 2005/106; H04L 12/2803
See application file for complete search history.

(56) References Cited

U.S. PATENT DOCUMENTS

| | | | |
|---|---|---|---|
| 6,873,921 B1 * | 3/2005 | Tucker, Jr. | G01V 1/001 340/429 |
| 10,302,499 B2 | 5/2019 | Dixon et al. | |
| 2009/0302220 A1 | 12/2009 | Micko | |
| 2018/0231419 A1 | 8/2018 | Modi et al. | |
| 2019/0272741 A1 | 9/2019 | MacKenzie et al. | |

\* cited by examiner

*Primary Examiner* — Christine S. Kim

(57) ABSTRACT

There is described a motion detection system of a building automation system comprising a motion sensing component and a processor. The motion sensing component is configured to generate a raw signal. The processor is configured to establish first-order difference signals based on the raw signal. The processor is also configured to identify in-band energy in a motion portion of a sensor frequency range based on the first-order difference signals and identify total energy in the sensor frequency range based on the first-order difference signals. In addition, the processor is configured to determine a ratio of the in-band energy and the total energy and generate a motion status update in response to determining that the ratio meets or exceeds a predetermined ratio threshold.

16 Claims, 12 Drawing Sheets

800

MOTION DETECTION SYSTEM AND METHOD OF A BUILDING AUTOMATION SYSTEM

RELATED APPLICATIONS

This application is related to U.S. patent application Ser. No. 16/779,085, Motion Detection System and Method of a Building Automation System, by Jun Gao and William Kerry Keal, filed on Jan. 31, 2020, and incorporated by reference in its entirety.

FIELD OF THE INVENTION

This application relates to the field of motion detection and, more particularly, to motion detection systems of building automation systems having enhanced precision to minimize false positives.

BACKGROUND

Lighting systems are designed to conserve energy. One form of an energy conserving lighting system includes motion detectors positioned throughout, for example, a building that detect occupancy. Lighting systems are activated when occupants are detected triggered by sensed motion, thereby saving energy. Once activated, lights associated with the lighting remain active (turned on) for a set amount of time. After the set amount of time, the lights are deactivated (turn off). This arrangement, however, has several limitations.

Motion detection is useful for providing intelligent lighting and/or security within the building. As stated above, the motion detection can be used to determine whether an occupant is present, and therefore, only provide lighting when an occupant is present. However, false positives in detection can waste energy or incorrectly assume security of the building has been breached. There are challenges associated with minimizing false positives for a motion detection system under a wide range of operating conditions and environmental variabilities.

SUMMARY

In accordance with one embodiment of the disclosure, there is provided a motion detection system based on energy ratio for building automation systems. The energy ratio approach, also known as the rPwD technique, utilizes the energy within a particular frequency range and the energy of a whole frequency range. The energy terms used in the technique are derived from the difference passive infrared ("ΔPIR") signal to remove the direct current ("DC") offset inherent in a raw passive infrared ("PIR") signal. The ratio of the energy in the particular frequency band ("in-band energy") to the energy of the whole frequency band ("total energy") is used as an indication of motion/no motion conditions.

The energy ratio approach provides several advantages. The rPwD technique is stable and robust because the results are bounded and the ratio aspect normalizes the detected signals. Also, the rPwd technique is less sensitive to signal variations, environmental/ambient noises, configuration variations, and sensor variations. Further, the rPwD technique may be configured and changed to deal with different false positive situations.

Compared to other motion detection techniques, the rPwD technique uses the ratio between in-band and total energy as an indicator. Since in-band energy is less than or equal to total energy, the rPwD is bounded between 0 and 1. Therefore, the rPwD is more robust and predictable. Other techniques can produce very large or small motion indicators that are not bounded. Also, the rPwD technique is less susceptible to environmental changes and signal drifting. Other common mode noises may cause result uncertainty in other motion detection techniques, are reduced significantly due to the normalization by the total energy. Further, the rPwD technique is flexible and several tunable parameters at different stages of the technique provide better false positive suppression lacking for most other motion detection techniques. For different sensor or configuration variations that are inevitably part of the motion detection system, the rPwD technique is better equipped to provide a relatively universal response.

One aspect is a motion detection system of a building automation system comprising a motion sensing component and a processor. The motion sensing component is configured to generate a raw signal. The processor is configured to establish first-order difference signals based on the raw signal. The processor also configured to identify in-band energy in a motion portion of a sensor frequency range based on the first-order difference signals and identify total energy in the sensor frequency range based on the first-order difference signals. The processor is further configured to determine a ratio of the motion energy and the total energy and generates a motion status update in response to determining that the ratio meets or exceeds a predetermined ratio threshold. The processor is further configured to identify the in-band energy by summing a first plurality of frequency components of the first-order difference signal below a predetermined in-band threshold of the sensor frequency range, and identify the total energy by summing a second plurality of frequency components of the first-order difference signal across the sensor frequency range.

Another aspect is a method for a motion detection system of a building automation system. Raw signal is received from a motion sensing component of the building automation system, in which the raw signal includes a sensor frequency range. First-order difference signals based on the raw signal are established. In-band energy in a motion portion of a sensor frequency range is identified based on the first-order difference signals, in which a first plurality of frequency components of the first-order difference signal, below a predetermined in-band threshold of the sensor frequency range, are summed. Total energy in the sensor frequency range is identified based on the first-order difference signals, in which a second plurality of frequency components of the first-order difference signal across the sensor frequency range are summed. A ratio of the motion energy and the total energy is determined, and a motion status update is generated in response to determining that the ratio meets or exceeds a predetermined ratio threshold.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
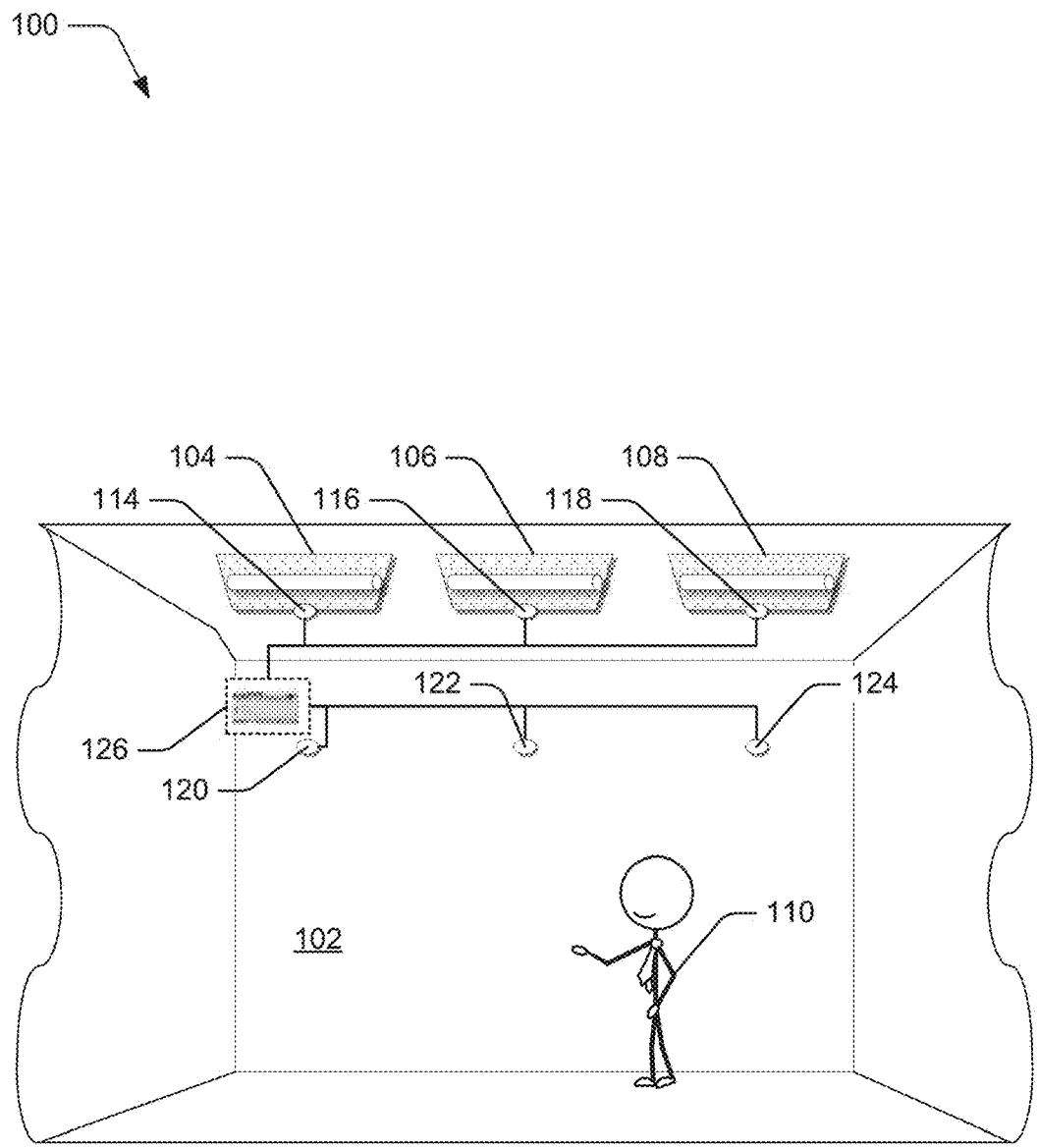
FIG. 1 is an illustration of an environment in an example implementation that is operable to employ techniques described herein.

Various technologies that pertain to systems and methods that facilitate motion detection in a building automation system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

There is described a motion detection system based on an energy ratio for building automation systems. Processing components of the motion detection system receives a raw signal or a stream of signals of a sensor frequency range from motion sensing component of the system. The processing components generate a stream of difference signals from the stream of raw signals to adjust a mean amplitude from the raw signals. For example, difference passive infrared ("ΔPIR") signals may be generated from raw passive infrared ("PIR") signals to remove a direct current ("DC") offset from the raw PIR signals. Based on the stream of difference signals, in-band energy in a motion portion of a frequency range and total energy of the entire frequency range may be generated in order to produce the energy ratio, also known as the "rPwD". Motion and non-motion conditions may be determined, and indicated by a motion status update, based on this ratio of the in-band energy to the total energy.

Referring to FIG. 1, there is shown an area 100, such as a room, that includes building structures, such as a wall 102, and/or appliances, such as light fixtures 104, 106, 108. The building structures and appliance may support one or more devices of a building automation system to detect presence and/or movement of an occupant or asset 110. The building automation system may include an array of sensors (such as motion sensors 114-124) and a controller 126 coupled via a wired or wireless link to the sensors. The array of sensors may be distributed throughout the area 100 (such as a ceiling, wall, floor, or other building structure), as well as other areas of a facility, so each sensor may be positioned at a building structure with an appliance (motion sensors 114, 116, 118) or without an appliance (motion sensors 120, 122, 124). The motion sensors 114-124 and the controller 126 are configured to detect and/or track motion within the area 100. An example of a motion sensor is, but is not limited to, a passive infrared sensor.

Figure 2:
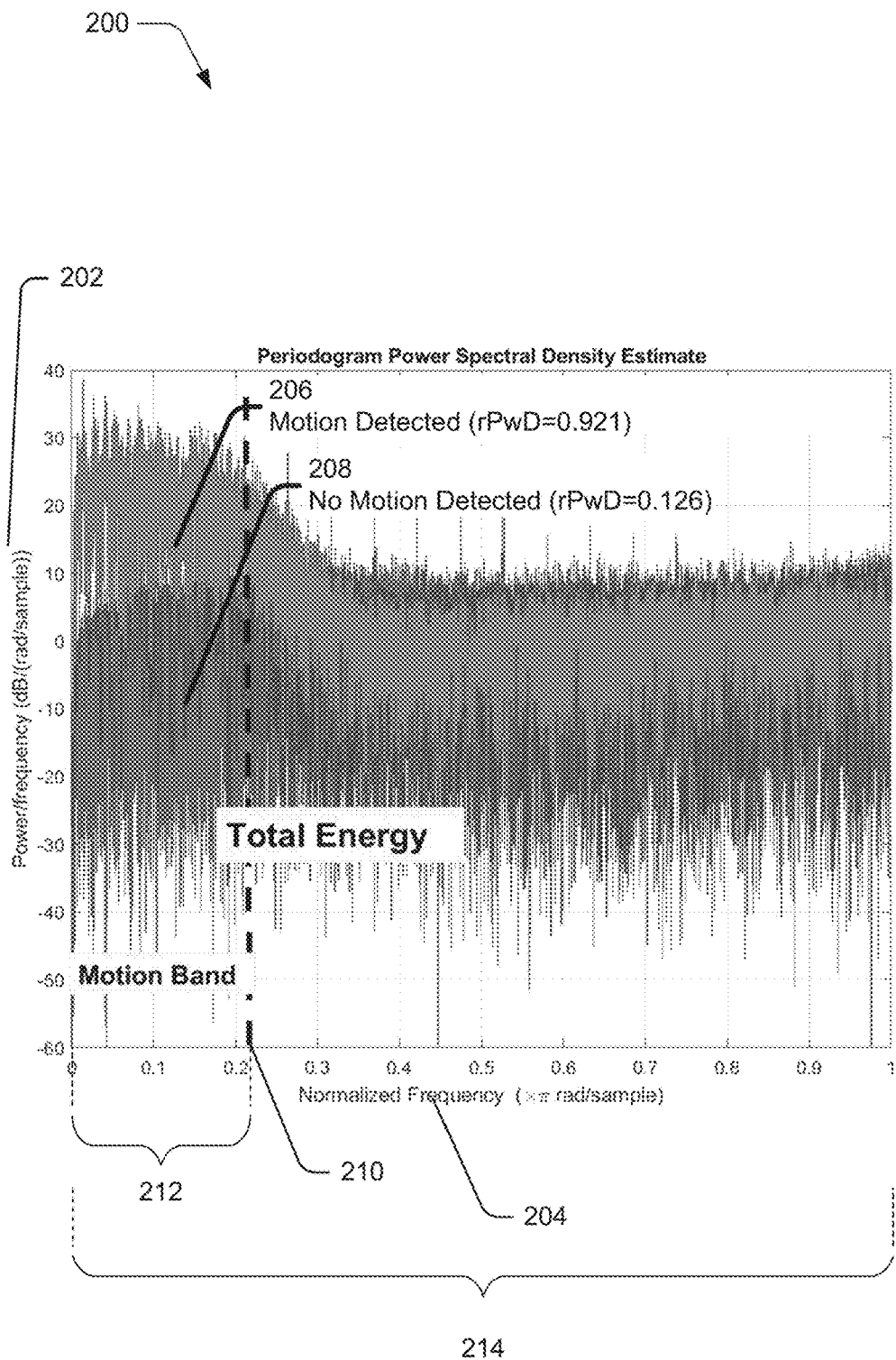
FIG. 2 is a graphic view of an example representation of a periodogram power spectral density estimate in accordance with the energy ratio approach for motion detection.

Referring to FIG. 2, there is shown a graph of an example representation 200 of a periodogram power spectral density estimate in accordance with the energy ratio approach for motion detection. In view of FIGS. 1 and 2, a motion sensor on the ceiling (motion sensors 114, 116, 118) or other locations (motion sensors 120, 122, 124) detects a change in thermal energy, particularly thermal energy from one or more occupants or assets 110. The sampling frequency of the motion sensors 114-124 should be high enough so that the sensors are responsive in view of any latency. If movement is not detected, then the thermal energy fluctuation detected by the sensor is relatively flat, caused by random thermal noises in the environment.

When a motion sensor 114-124 is used to detect motion of one or more occupants or assets 110, the motion causes energy changes in a specific frequency band, i.e., motion band. For example, most of the energy changes may be in a particular frequency range, such as below 8 Hz. When no motion is detected, each motion sensor 114-124 may generate pseudo-random values around a mean value of the detected signal, such as thermal noise and/or random bit flips.

Referring specifically to FIG. 2, the energy ratio approach of the motion detection technique is represented in this graph by power/frequency 202 in db/(rad/sample) provided along the y-axis and normalized frequency 204 in 7E rad/sample provided along the x-axis. A first power estimation 206 representing detected motion, e.g., typical motion power estimation, is shown by a lighter area whereas a second power estimation 208 representing no detected motion is shown as a darker area. Generally, the first and second power estimations 206, 208 have similar power levels at higher normalized frequencies but these signals are more distinct at lower normalized frequencies.

As illustrated in FIG. 2, the first power estimation 206 which represents detected motion has a different power level (i.e., higher power level) below a particular frequency threshold 210 than a power level above the particular frequency threshold within a motion band 212. In contrast, the second power estimation 208 which represents no detected motion is more consistent across the sensor frequency range than the first power estimation 206, in which the power level for the second power estimation 208 above and below the particular frequency threshold 210 does not differ as much as the power level for the first power estimation 206. The graph 200 shows the second power estimation 208, i.e., the darker area, which is generally flat because it only includes thermal noise. For example, if we draw a line at 0.21 normalized frequency (8 Hz if the sampling frequency is, for example, 77 Hz), energy in the motion band may be compared to the whole frequency range. When there is no motion, the energy ratio of the first-order difference signal is about 0.1; when there is continuous motion, the rPwD is about 0.92. The energy ratio, i.e. rPwD, may be represented by:

$$rPwD = \frac{PWD_{inband}}{PWD_{total}} = \frac{\sum_{i=1}^{N} \text{filtered\_}\Delta PIR_i^2}{\sum_{i=1}^{N} \Delta PIR_i^2} \quad (1)$$

The energy ratio-based motion detection technique detects motion by thresholding the energy ratio rPwD, where the rPwD is in the range of 0 to 1. In an implementation, the first-order difference signal (such as ΔPIR) may be used to compute the energy. The signal differential is utilized instead of the raw signal because the differential removes the DC from the raw signal.

The energy ratio, i.e., rPwD, is a ratio of in-band energy and total energy. The in-band energy is identified by a motion band 212 of the normalized frequency below the particular frequency threshold 210, and the total energy is identified by a total band 214 of the normalized spectrum across the sensor frequency range, including energy above and below the particular frequency threshold 210. For example, FIG. 2 illustrates the first power estimation 206 represented by an rPwD of about 0.921 for detected motion and second power estimation 208 represented by rPwD of about fpar0.126 for no detected motion. Based on the energy ratio distinguishing between motion detection and no motion detection, a motion status update may be generated in response to determining that the ratio meets or exceeds a predetermined ratio threshold. For the example described above, the predetermined ratio threshold would be somewhere between 0.126 and 0.921.

Figure 3:
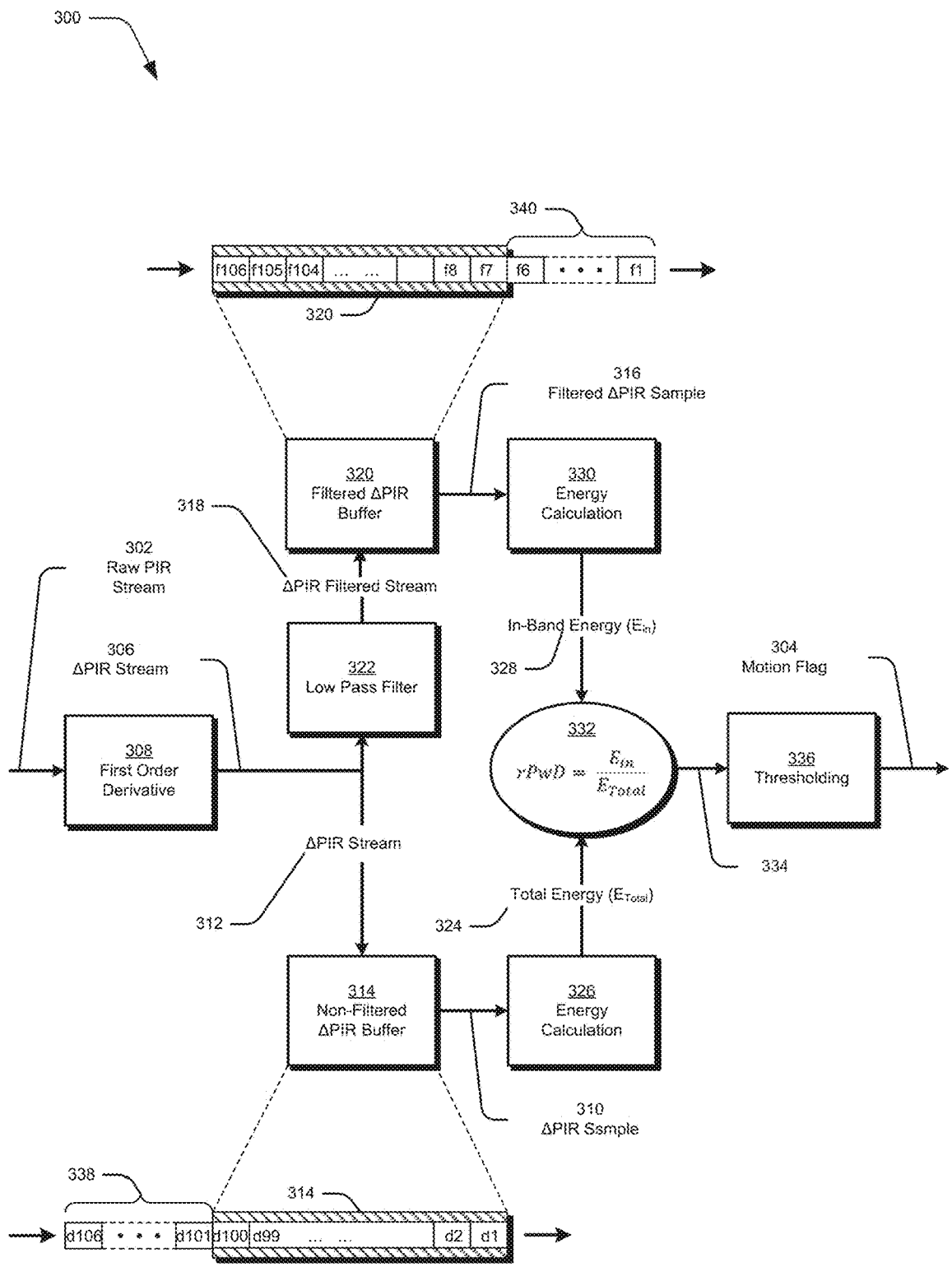
FIG. 3 is a flow diagram of an example representation of a filter-based technique in accordance with the energy ratio approach for motion detection.

FIG. 3 is a flow diagram of an example representation of a filter-based technique in accordance with the energy ratio approach for motion detection. A motion detection system 300 of a building automation system receives raw signal 302 from a motion sensing component of the building automation system and produces a motion status update 304 for use by other devices of the building automation system. The motion status update 304 may be a motion flag, visual indicator, audio indicator, or other types of output usable by a device of the building automation system. In particular, first-order difference signals 306, or a stream thereof, may be established based on the raw signal 302 by a first-order derivative component 308.

The first-order difference signals 306 may be used as the basis to identify in-band energy in a motion portion of the sensor frequency range and total energy in the sensor frequency range. The motion portion of the sensor frequency range may be identified as, for example, the motion band 212, and the total energy of the sensor frequency range may be identified as, for example, the total band 214. For identifying total energy, a non-filtered sample 310 may be produced from the first-order difference signals 312 (which are the same as the first-order difference signals 306 generated by the first-order derivative component 308) by storing at, and sampling from, a non-filtered buffer 314. For identifying in-band energy, a filtered sample 316 may be produced from filtered signals 318 based on the first-order difference signals 306 by storing at, and sampling from, a filtered buffer 320. The filtered signals 318 are filtered first-order difference signals, based on the first-order difference signals 306, generated by a low pass filter 322. An example of the low pass filter is, but is not limited to, an infinite impulse response filter. The total energy 324 is determined by an energy calculation component 326 based on the non-filtered sample 310 from the non-filtered buffer 314, the in-band energy 328 is determined by an energy calculation component 330 based on the filtered sample 316 from the non-filtered buffer 314.

An energy ratio component 332 determines the energy ratio 334, i.e., rPwD, of the in-band energy 328 and the total energy 324. For example, the energy ratio 334 may be determine by a simple division of the in-band energy 328 by the total energy 324. The energy ratio 334 may then be compared to a predetermined ratio threshold to determine whether or not motion is detected or is not detected. As described above, the predetermined ratio threshold may be a rPwD value between a known detected motion value and a known no detected motion value. A thresholding component 336 may generate a motion status update 304 in response to determining that the ratio meets or exceeds a predetermined ratio threshold.

The flow diagram of FIG. 3 also illustrates a two-buffer implementation including the non-filtered buffer 314 and the filtered buffer 320. Each buffer 314, 320 has a predetermined buffer size that corresponds to a sampling size of the in-band energy calculation component 326 and total energy calculation component 330 with filter's group delay. The sampling size may be the same or different for the buffers 314, 320. For example, the sampling size of the non-filtered buffer 314 and the filtered buffer 320 may be the same, such as 100 samples. The buffer samples follow a FIFO (First-In First-Out) fashion on a sample-by-sample basis, so a group of samples having a predetermined sampling size are used to compute the total energy 314 at each sampling period. Similarly, as the filtered signals 318 enters the filtered buffer 320, filtered samples 316 may be removed from the filtered buffer in groups of 100. It is to be noted that the filter-based technique of the energy ratio approach for motion detection may create a group delay 340, which is a characteristic of the low pass filter 322, when implementing the two-buffer embodiments. For these embodiments, the filtered buffer is "behind" the unfiltered buffer by the amount of the group delay 340.

Scaling and Randomization of Sensor Buffer

Figure 4:
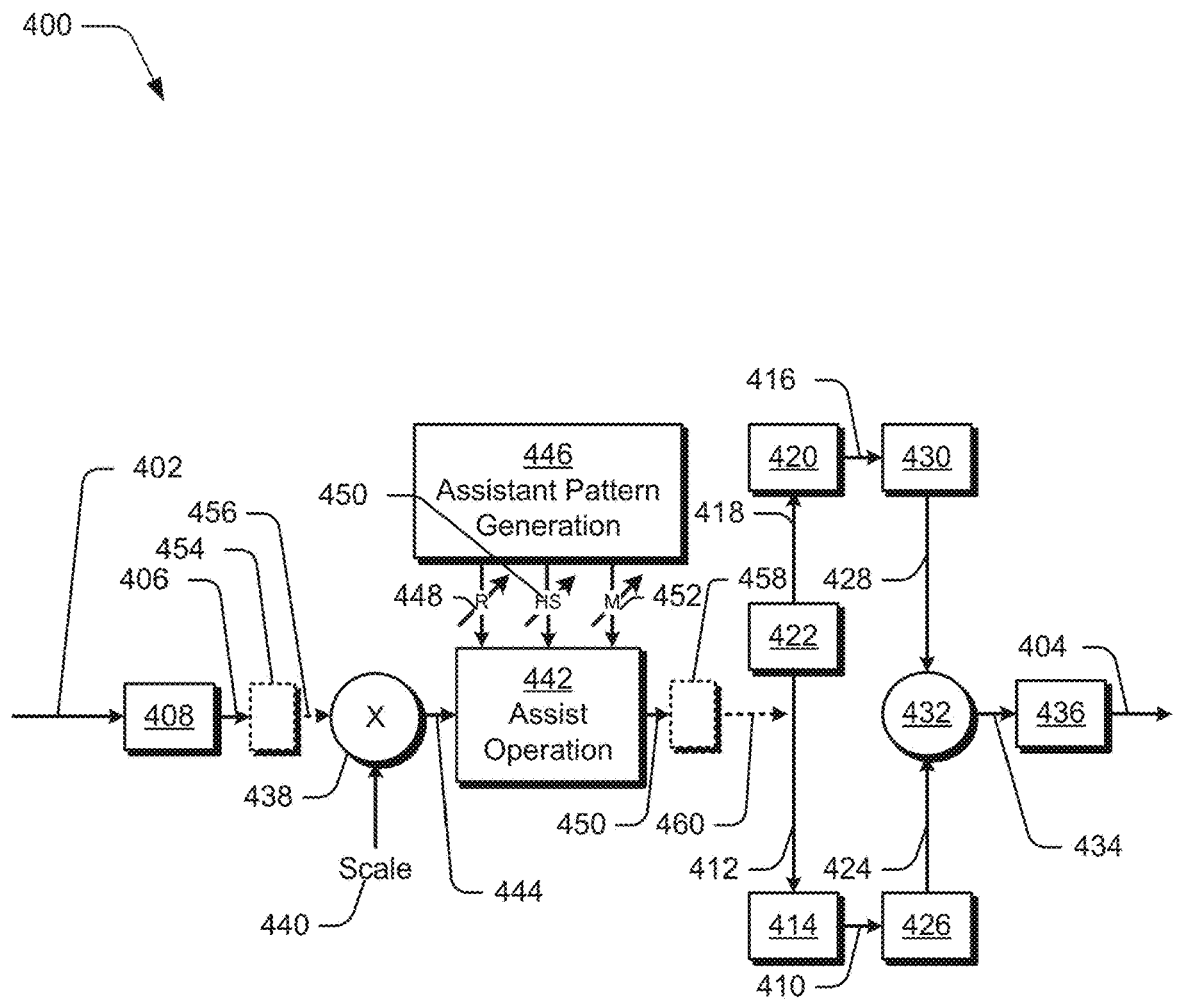
FIG. 4 is a flow diagram of an example representation of a scale and randomization technique that may be applied to the energy ratio approach for motion detection.

Referring to FIG. 4, there is shown a flow diagram of an example representation of a scale and randomization technique that may be applied to the energy ratio approach for motion detection. A motion detection system 400 of a building automation system receives raw signal 402 of a sensor frequency range from a motion sensing component of the building automation system and produces a motion status update 404 for use by other devices of the building automation system, similar to the process described above for the motion detection system 300 of FIG. 3. First-order difference signals 406, or a stream thereof, may be established based on the raw signal 402 by a first-order derivative component 408. In-band energy in a motion portion of the sensor frequency range and total energy in the sensor frequency range may be identified based on the first-order difference signals 406. For identifying the total energy, a non-filtered sample 410 may be produced based on, at least in part, the first-order difference signals 412 by storing at, and sampling from, a non-filtered buffer 414. For identifying in-band energy, a filtered sample 416 may be produced from filtered signals 418 based on, at least in part, the first-order difference signals 406 by storing at, and sampling from, a filtered buffer 420. The filtered signals 418 are filtered first-order difference signals, based on, at least in part, the first-order difference signals 406, generated by a low pass filter 422. The total energy 424 is determined by an in-band energy calculation component 426 based on the non-filtered sample 410 removed from the non-filtered buffer 414, the in-band energy 428 is determined by a total energy calculation component 430 based on the filtered sample 416 removed from the non-filtered buffer 414.

An energy ratio component 432 determines the energy ratio 434, i.e., rPwD, of the in-band energy 428 and the total energy 424. The energy ratio 434 may then be compared to a predetermined ratio threshold to determine whether or not motion is detected or is not detected. A thresholding component 436 may generate a motion status update 404 in response to determining that the ratio meets or exceeds a predetermined ratio threshold.

The motion detection system 400 further provides scaling and modifying functions to address any issues with long-running zeros in the first-order difference signal. The raw signal 402 may include same long running values that result in long-running zeros in the first-order difference signal. For example, the long-running zeros may be troublesome and cause a divide-by-zero problem. It may also result in false motion detection due to small, random noise following the long-running zeros.

The motion detection system 400 includes tunable features to address the above issues. The motion detection system 400 may scale the first-order difference signal by a predetermined scale value, and/or modify randomly the first-order difference signal in response to one or more techniques. Examples of these techniques includes, but are not limited to, a ratio, a half size, or a mode. A multiplier 438 may apply the predetermined scale value 440 to all first-order difference signals. An assist operation component 442 may then modify the first-order difference signals 406 or the scaled signal 444 generated by the multiplier 438 to disrupt the long-running zeros.

An assistant pattern generation component 446 may provide one or more tunable values 448, 450, 452 to the assist operation component 442 identify, at least in part, how to modify the first-order difference signals 406 or the scaled signal 444. For one embodiment, the assistant pattern generation component 446 may provide ratio (R) values 448 in which a random insertion of ±1's is multiplied by the ratio values 448 relative to the first-order difference signals 406 or the scaled signal 444. For example, if the predetermined scale value is 5 and the ratio value 448 is 0.6, then the random values generated by the assist operation component 442 may be ±(5*0.6), so that a difference of ±3 may added to the scaled signal 444. For another embodiment, the assistant pattern generation component 446 may provide half-size (hS) values 450 corresponding to a distance between the differential values added. A + or − differential value may be added to every half-size sample of the first-order difference signals 406 or the scaled signal 444. For yet another embodiment, the assistant pattern generation component 446 may provide a mode value 452, such as "Continuous" mode value or "Break Only" mode value. The "Continuous" mode value may correspond to random ± differential values being inserted continuously into the stream of the first-order difference signals 406 or the scaled signals 444. The "Break Only" mode value may correspond to random ± differential values being only inserted when continuously running zeros longer than the half-size values 450 is detected in the first-order difference signals 406 or the scaled signals 444. For still another embodiment, the assistant pattern generation component 446 may provide values from two or more of the tunable values 448, 450, 452 for the assist operation component 442. The assist operation component 442 generates modified values 450, based at least in part on one or more of the above techniques, which may serve as the inputs to the non-filtered buffer 414 and the low pass filter 422.

It is to be noted that various techniques may be implemented to enhance the operations of the motion detecting systems described herein. Specifically, the techniques of scaling and randomization of the sensor buffer, sample skipping for radio transmission interference, dead zone shifting, and buffer windowing are described. Also, two or more of these techniques may be combined for further enhancement of the operations of these motion detecting systems. For example, referring to the motion detecting system 400 of FIG. 4, another technique 454 may be added before the scaling and randomization of the sensor buffer to generate input 456 to the scaling and randomization of the sensor buffer; another technique 458 may be added after the scaling and randomization of the sensor buffer to receiving output 460 from the scaling and randomization of the sensor buffer; or different techniques 454, 458 may be added before and after the scaling and randomization of the sensor buffer.

Sample Skipping for Radio Tx Interference

Figure 5:
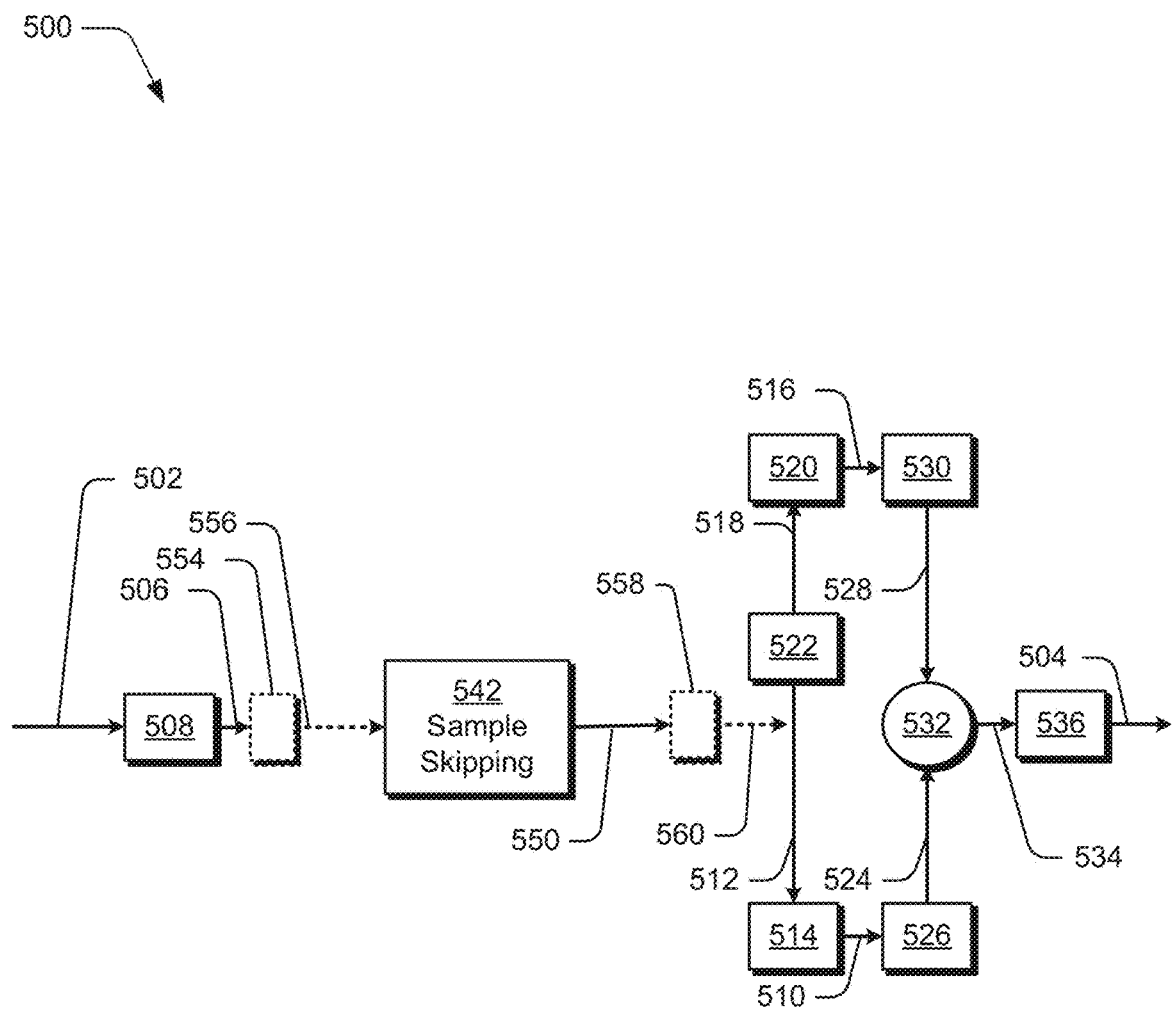
FIG. 5 is a flow diagram of an example representation of a sample skipping technique that may be applied to the energy ratio approach for motion detection.

Referring to FIG. 5, there is shown a flow diagram of an example representation of a sample skipping technique that may be applied to the energy ratio approach for motion detection. A motion detection system 500 of a building automation system receives raw signal 502 of a sensor frequency range from a motion sensing component of the building automation system and produces a motion status update 504 for use by other devices of the building automation system, similar to the process described above for the motion detection system 300 of FIG. 3. First-order difference signals 506, or a stream thereof, may be established based on the raw signal 502 by a first-order derivative component 508. In-band energy in a motion portion of the sensor frequency range and total energy in the sensor frequency range may be identified based on the first-order difference signals 506. For identifying the total energy, a non-filtered sample 510 may be produced based on, at least in part, the first-order difference signals 512 by storing at, and sampling from, a non-filtered buffer 514. For identifying in-band energy, a filtered sample 516 may be produced from filtered signals 518 based on, at least in part, the first-order difference signals 506 by storing at, and sampling from, a filtered buffer 520. The filtered signals 518 are filtered first-order difference signals, based on, at least in part, the first-order difference signals 506, generated by a low pass filter 522. The total energy 524 is determined by an in-band energy calculation component 526 based on the non-filtered sample 510 removed from the non-filtered buffer 514, the in-band energy 528 is determined by a total energy calculation component 530 based on the filtered sample 416 removed from the non-filtered buffer 514.

An energy ratio component 532 determines the energy ratio 534, i.e., rPwD, of the in-band energy 528 and the total energy 524. The energy ratio 534 may then be compared to a predetermined ratio threshold to determine whether or not motion is detected or is not detected. A thresholding component 536 may generate a motion status update 504 in response to determining that the ratio meets or exceeds a predetermined ratio threshold.

The motion detection system 500 further provides sample skipping functions to address any issues by the motion sensor, which is susceptible to interferences from radio frequency ("RF") transmissions. Examples of interfering RF transmission include, but are not limited to Wi-Fi, Bluetooth/BLE, and IEEE 802.15.4 network radio transmissions. The RF transmission may introduce disturbances to the motion sensor signals. For example, interference may occur due to similarities of motion sensor signal signature corresponding to minor motion detection and, thus, may cause false motion detection. For example, RF transmission by IEEE 802.15.4, in proximity to the motion sensor, may inject energy into the motion sensor stream. This energy, when not suppressed, might cause false motion detection.

The motion detection system 500 provides sample skipping functions for radio transmission interference by skipping multiple (n) samples in synchronous with the radio transmission that are not associated with the motion sensing component. The motion detection system 500 may skip samples in sync with the RF transmission. For example, where n is six, the next six motion sensor samples are skipped by the motion detection system 500 and, when the seventh sample after transmission arrives, the differences between the seventh sample and the first sample may be compared. The difference is then linearly backfilled into the buffer or buffers of the motion detection system 500. Backfilling helps to avoid a residual between the seventh sample and the first sample at the transmission.

The motion sensors may include co-located or proximal radio components that communicate by RF transmission (for example, IEEE 802.15.4, Wi-Fi, or Bluetooth/BLE) on a periodical base. The sample skipping technique of the motion detection system 500 suppresses false motion detection due to transmission-induced interference, particularly when the RF transmission is once every second or slower. The motion sensor may operate in this way so long as data does not need to be acquired during the skipped n samples, effectively a "blind" period for the motion sensor for n/(sampling frequency) percentage of the time.

It is to be noted that various techniques may be implemented to enhance the operations of the motion detecting systems described herein. Specifically, the techniques of scaling and randomization of the sensor buffer, sample skipping for radio transmission interference, dead zone shifting, and buffer windowing are described. Also, two or more of these techniques may be combined for further enhancement of the operations of these motion detecting systems. For example, referring to the motion detecting system 500 of FIG. 5, another technique 554 may be added before the sample skipping to generate input 556 to the sample skipping; another technique 558 may be added after the sample skipping to receiving output 560 from the sample skipping; or different techniques 554, 558 may be added before and after the sample skipping.

Dead Zone Shifting

Figure 6:
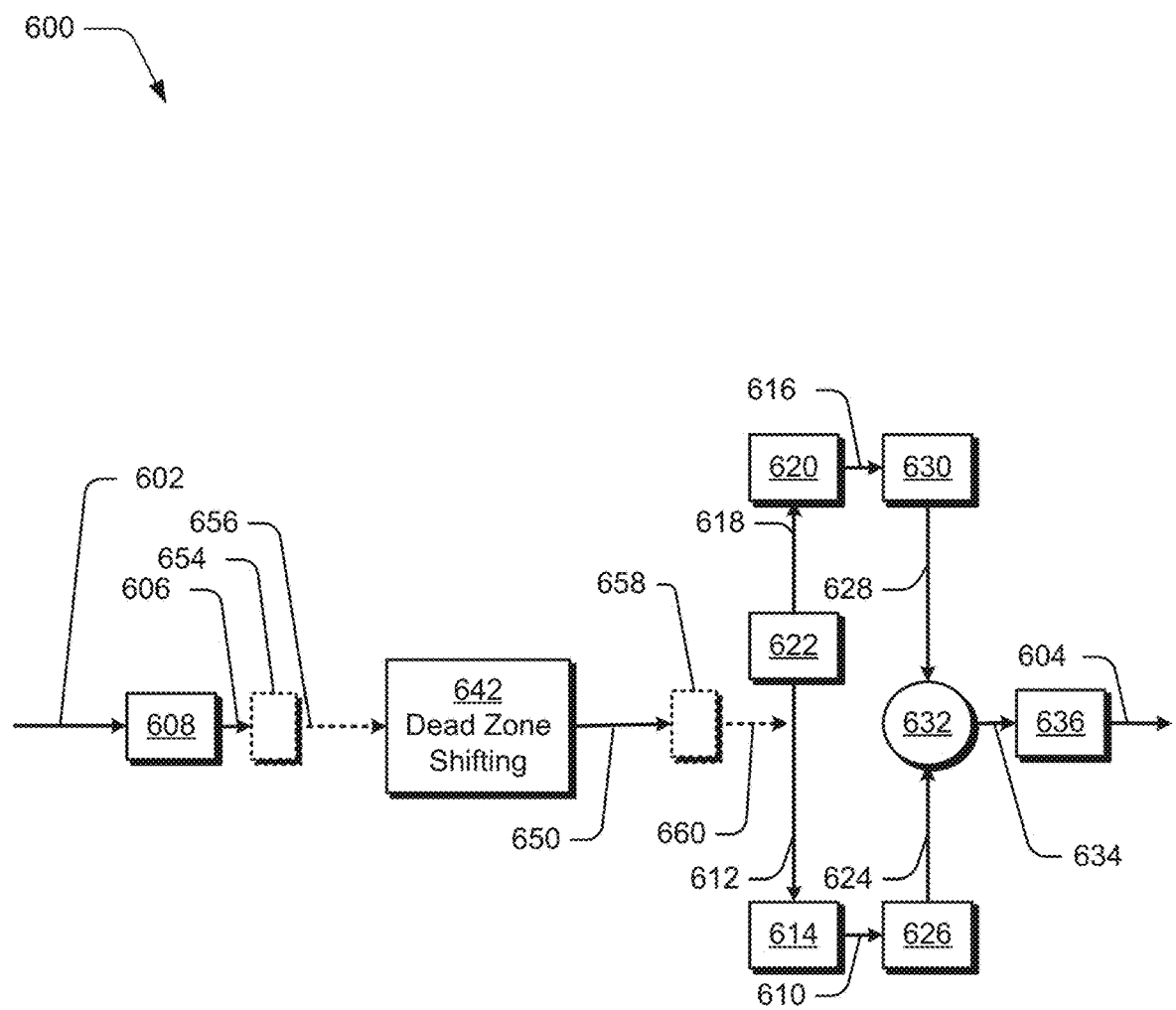
FIG. 6 is a flow diagram of an example representation of a dead zone shifting technique that may be applied to the energy ratio approach for motion detection.

Referring to FIG. 6, there is shown a flow diagram of an example representation of a dead zone shifting technique that may be applied to the energy ratio approach for motion detection. A motion detection system 600 of a building automation system receives raw signal 602 of a sensor frequency range from a motion sensing component of the building automation system and produces a motion status update 604 for use by other devices of the building automation system, similar to the process described above for the motion detection system 300 of FIG. 3. First-order difference signals 606, or a stream thereof, may be established based on the raw signal 602 by a first-order derivative component 608. In-band energy in a motion portion of the sensor frequency range and total energy in the sensor frequency range may be identified based on the first-order difference signals 606. For identifying the total energy, a non-filtered sample 610 may be produced based on, at least in part, the first-order difference signals 612 by storing at, and sampling from, a non-filtered buffer 614. For identifying in-band energy, a filtered sample 616 may be produced from filtered signals 618 based on, at least in part, the first-order difference signals 606 by storing at, and sampling from, a filtered buffer 620. The filtered signals 618 are filtered first-order difference signals, based on, at least in part, the first-order difference signals 606, generated by a low pass filter 622. The total energy 624 is determined by an in-band energy calculation component 626 based on the non-filtered sample 610 removed from the non-filtered buffer 614, the in-band energy 628 is determined by a total energy calculation component 630 based on the filtered sample 416 removed from the non-filtered buffer 614.

An energy ratio component 632 determines the energy ratio 634, i.e., rPwD, of the in-band energy 628 and the total energy 624. The energy ratio 634 may then be compared to a predetermined ratio threshold to determine whether or not motion is detected or is not detected. A thresholding component 636 may generate a motion status update 604 in response to determining that the ratio meets or exceeds a predetermined ratio threshold.

For the motion detection system 600, the process of identifying the in-band energy includes applying dead zone shifting to the first-order difference signals in response to RF interference transmission bursts. Transmissions in and around the motion sensor may project transmission energy back to the motion sensor, thus corrupting the sensor signal and cause false positives. Also, when the motion sensor is configured as a transport bridge or a hopper, the sensor communicates and transmits multiple bursts at a time. For the motion sensor as a hopper, it is not uncommon for transmissions to occur back-to-back, and the communication bursts may happen quickly, such as greater than 1 Hz. Thus, the percentage of failing to detect motion may be higher than usual and effectively render the motion sensor less useful for motion detection.

Further for the motion detection system 600, the process of applying the dead zone shifting to the first-order difference signals includes reducing larger values of the first-order difference signals and suppressing smaller values of the first-order difference signals. The dead zone shifting technique applies a gain curve for the next n samples, quantified by a shift value ("SV") when an interference transmission occurs. For the gain curve, the first-order derivative component 608 is considered a dead zone and set to a null value, such as zero, in response to the magnitude (absolute value) of the first-order derivative component 608 being less than or equal to the shift value. In response to the magnitude of the first-order derivative component 608 being greater than the shift value, the magnitude (absolute value) of the first-order derivative component 608 is reduced by a predetermined value, such as the shift value. For example, for a shift value of four and a window length where n is eight, the next eight samples will be modified by the gain curve of the dead zone shifting whenever a transmission occurs. If many transmissions occur back-to-back, the gain curve of the dead zone shifting will apply to all affected first-order difference signals 606 and the eight samples after the last transmission in the interference transmission. The dead zone shifting technique effectively reduces the sensitivity of the motion sensor by the shift value, but still allows significant changes in sensed values to pass through, i.e., the magnitude of the first-order difference signals is greater than or equal to the shift value. The dead zone shifting effectively suppressed small disturbance caused by transmissions when there is no motion.

It is to be noted that various techniques may be implemented to enhance the operations of the motion detecting systems describe herein. Specifically, the techniques of scaling and randomization of the sensor buffer, sample skipping for radio transmission interference, dead zone shifting, and buffer windowing are described. Also, two or more of these techniques may be combined for further enhancement of the operations of these motion detecting systems. For example, referring to the motion detecting system 600 of FIG. 6, another technique 654 may be added before the dead zone shifting to generate input 656 to the dead zone shifting; another technique 658 may be added after the dead zone shifting to receiving output 660 from the dead zone shifting; or different techniques 654, 658 may be added before and after the dead zone shifting.

Buffer Windowing

Figure 7:
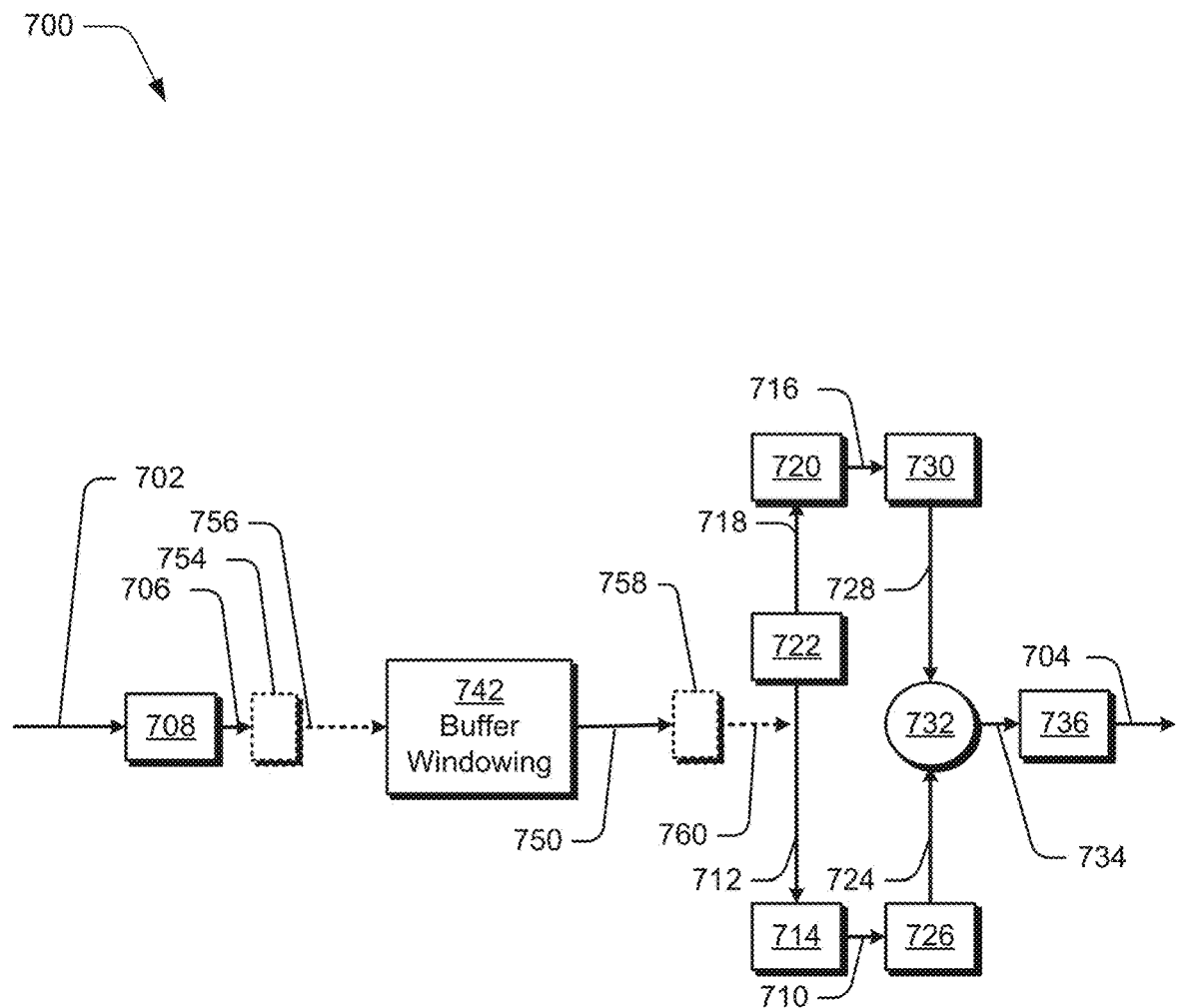
FIG. 7 is a flow diagram of an example representation of a buffer windowing technique that may be applied to the energy ratio approach for motion detection.

FIG. 7 a flow diagram of an example representation of a buffer windowing technique that may be applied to the energy ratio approach for motion detection. A motion detection system 700 of a building automation system receives raw signal 702 of a sensor frequency range from a motion sensing component of the building automation system and produces a motion status update 704 for use by other devices of the building automation system, similar to the process described above for the motion detection system 300 of FIG. 3. First-order difference signals 706, or a stream thereof, may be established based on the raw signal 702 by a first-order derivative component 708. In-band energy in a motion portion 212 of the sensor frequency range and total energy in the sensor frequency range may be identified based on the first-order difference signals 706. For identifying the total energy, a non-filtered sample 710 may be produced based on, at least in part, the first-order difference signals 712 by storing at, and sampling from, a non-filtered buffer 714. For identifying in-band energy, a filtered sample 716 may be produced from filtered signals 718 based on, at least in part, the first-order difference signals 706 by storing at, and sampling from, a filtered buffer 720. The filtered signals 718 are filtered first-order difference signals, based on, at least in part, the first-order difference signals 706, generated by a low pass filter 722. The total energy 724 is determined by an in-band energy calculation component 726 based on the non-filtered sample 710 removed from the non-filtered buffer 714, the in-band energy 728 is determined by a total energy calculation component 730 based on the filtered sample 416 removed from the non-filtered buffer 714.

An energy ratio component 732 determines the energy ratio 734, i.e., rPwD, of the in-band energy 728 and the total energy 724. The energy ratio 734 may then be compared to a predetermined ratio threshold to determine whether the motion is detected or is not detected. A thresholding component 736 may generate a motion status update 704 in response to determining that the ratio meets or exceeds a predetermined ratio threshold.

For the motion detection system 700, identifying the in-band energy in the motion portion 212 of the sensor frequency range includes applying windowing to the filtered first-order difference signals to reduce a transient effect of the low pass filter 722, such as for example an infinite impulse response filter. The low pass filter 722 may cause the motion detection system 700 to indicate false detection of motion under certain conditions. In particular, the transient response to an impulse may take many sampling periods to dissipate.

Figure 8:
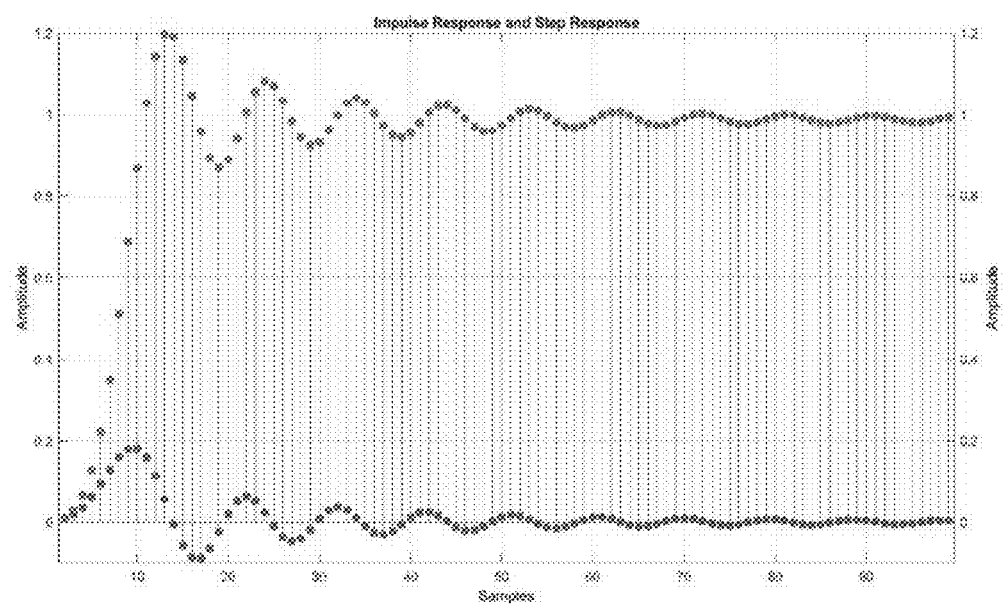
FIG. 8 is a graphic view of an example representation of impulse and step responses of a low pass filter.

For the energy ratio (rPwD) technique, the low pass filter 722, particularly an infinite impulse response low pass filter, may cause a transient effect that last longer than the length of buffers, thus, accounting for group delay uncertainty. To illustrate, FIG. 8 shows impulse and step response of a low pass filter, such as an infinite impulse response filter. To compute the energy ratio, the non-filtered buffer 714 and the filtered buffer 720 may hold non-filtered and filtered samples, respectively. The transient property of the filter manifests itself as a buffer problem. When a significant impulse or step stimulus happens in the raw signal 702, one larger first-order difference signal of the non-filtered signals 706 may be pushed into the non-filtered buffer 714, and multiple (corresponding to the filter's transient response settling time) larger than normal filtered signals 718 may be pushed into filtered buffer 730. N sampling periods later (N is the length of each buffer), the large sample in the non-filtered buffer is pushed out of the buffer 714, resulting in the total energy dropping dramatically, but the filtered buffer 720 still holds the larger samples from the filter's transient response. The net result is the rPwD increases unexpectedly N sampling periods after the impulse or step stimulus first occurs, potentially generating a false detection of motion.

Also, by implementing the low pass filter 722, especially the Infinite Impulse Response type, the group delay may not be constant. When an impulse or a step event happens, the actual group delay can be several sampling periods lower than the currently used group delay, resulting in misalignment of filtered and non-filtered buffers. The filtered buffer 720 may have filtered samples of the impulse and step event before non-filtered buffer 714. Thus, a false positive detection of motion may occur where there is sufficient energy in the filtered buffer 720 before the large samples are pushed into the non-filtered buffer 714.

Figure 9:
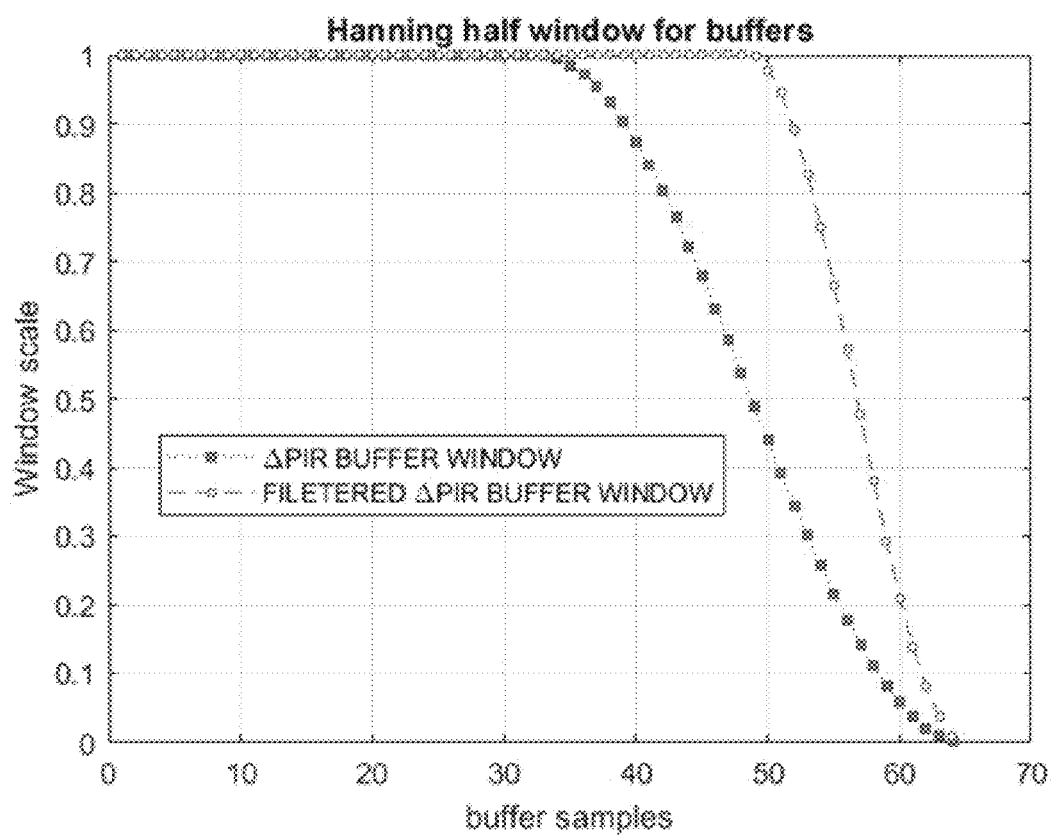
FIG. 9 is a graphic view of an example representation of windowing on non-filtered and filtered buffers.

The motion detection system 700 uses windowing on the non-filtered and filtered buffers 714, 720 to suppress false indications of motion. In particular, the motion detection system 700 includes a windowing technique to lessen the impact of the low pass filter's transient effect. The transient impact may be reduced by minimizing the weight of the older samples in the buffer. An example of the windowing technique is, but is not limited to, a partial Hanning window. As shown in FIG. 9, the windowing may be applied to both the non-filtered buffer (i.e., the first-order difference signal buffer) and the filtered signal buffer, with potentially different roll-off curves.

It is to be noted that various techniques may be implemented to enhance the operations of the motion detecting systems describe herein. Specifically, the techniques of scaling and randomization of the sensor buffer, sample skipping for radio transmission interference, dead zone shifting, and buffer windowing are described. Also, two or more of these techniques may be combined for further enhancement of the operations of these motion detecting systems. For example, referring to the motion detecting system 700 of FIG. 7, another technique 754 may be added before the dead zone shifting to generate input 756 to the dead zone shifting; another technique 758 may be added after the dead zone shifting to receiving output 760 from the dead zone shifting; or different techniques 754, 758 may be added before and after the dead zone shifting.

Power Spectrum Based rPwD Technique

Figure 10A:
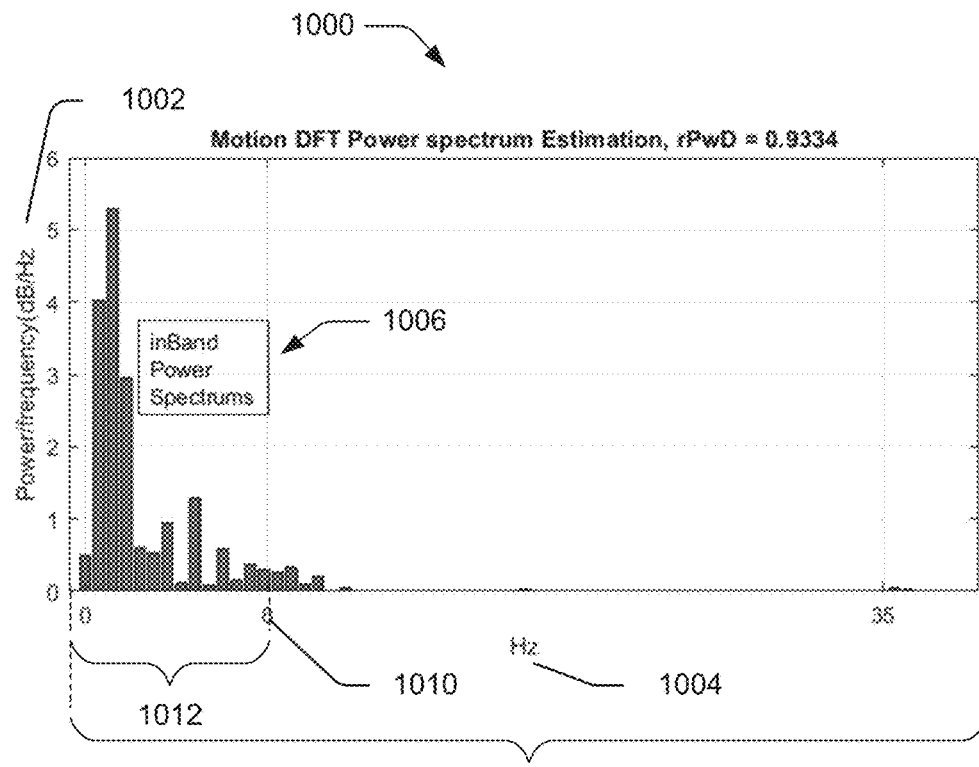
FIGS. 10A and 10B are graphic views of example representations of power spectrum estimations for a Fourier transform-based technique in accordance with the energy ratio approach for motion detection.
Figure 10B:
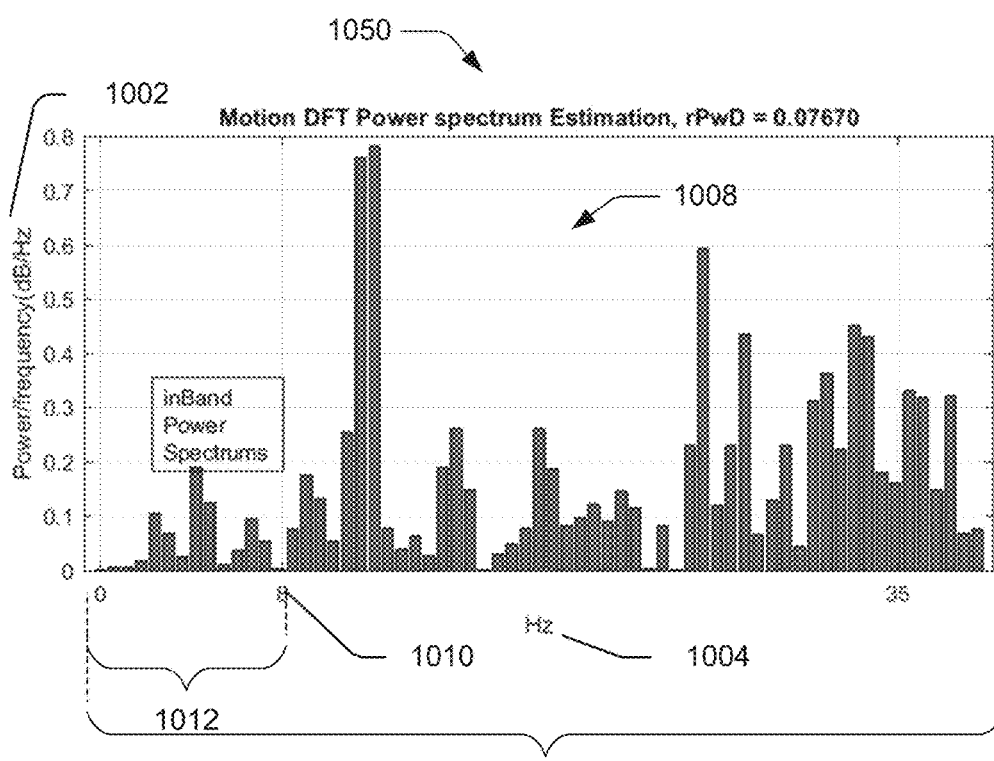

FIGS. 10A and 10B are graphic views of example representations of power spectrum estimations 1000, 1050 for a power spectral estimates using Fourier transform-based technique in accordance with the energy ratio approach for motion detection. The magnitude response of Fourier transform of a signal can be used to calculate the power spectrum of the signal. The low pass filter is not needed for the energy calculation of the energy ratio. Instead, energy level sat the particular frequency threshold and below is compared to all energy levels across the sensor frequency range.

Referring specifically to FIGS. 10A and 10B, the energy ratio approach of the motion detection technique is represented in this graph by power/frequency 1002 in db/(rad/sample) provided along the y-axes and frequency 1004 in Hertz provided along the x-axes. A first power estimation 1006 representing detected motion, e.g., typical motion power estimation, is shown in FIG. 10A whereas a second power estimation 1008 representing no detected motion is shown in FIG. 10B. The first power estimation 1006 which represents detected motion has a different power level (i.e., higher power level) below a particular frequency threshold 1010 than a power level above the particular frequency threshold within a motion band 1012. In contrast, the second power estimation 1008 which represents no detected motion, in which the power level for the second power estimation 1008 is diverse across the sensor frequency range, above and below the particular frequency threshold 1010. For example, if we draw a line at about eight hertz at the graphs of FIGS. 10A & 10B, energy in the motion band may be compared to the whole frequency range. When there is no motion, the energy ratio of the first-order difference signal is about 0.07670; when motion is detected, the rPwD is about 0.9334.

The energy ratio, i.e., rPwD, is a ratio of an in-band energy and a total energy The in-band energy is identified by the sum of all frequency components in a motion band 1012 of the frequency below the particular frequency threshold 1010, and the total energy is identified by the sum of a total band 1014 of the frequency across the sensor frequency range, including energy above and below the particular frequency threshold 1010. For the example shown in FIGS. 10A and 10B, as stated above, the first power estimation 1002 represented by a rPwD of about 0.9334 for detected motion and second power estimation 1000 represented by rPwD of about 0.07670 for no detected motion. Based on the energy ratio distinguishing between motion detection and no motion detection, a motion status update may be generated in response to determining that the ratio meets or exceeds a predetermined ratio threshold. For the example described above, the predetermined ratio threshold would be somewhere between 0.07670 and 0.9334.

For the Fourier transform-based technique, the motion detection system uses a fast Fourier transform ("FFT"), an implementation of discrete Fourier transform ("DFT") to compute the power spectral estimates of the frequency components of the first-order difference signals, then sums up all components within the in-band energy and total energy, and determine the ratio of these two sums. An example of a FFT is, but is not limited to, a real-value fast Fourier transform ("RV FFT"), which is an implementation of FFT when inputs are all real numbers. In particular, a processor of the motion detection system identifies in-band energy in a motion portion of the sensor frequency range based on the first-order difference signals, identifies total energy in the sensor frequency range based on the first-order difference signals, determines a ratio of the motion energy and the total energy, and generates a motion status update in response to determining that the ratio meets or exceeds a predetermined ratio threshold. The frequency resolution of the Fourier transform-based technique would be:

$$\Delta f = \frac{f_s}{N_{DFT}} \quad (2)$$

Figure 11:
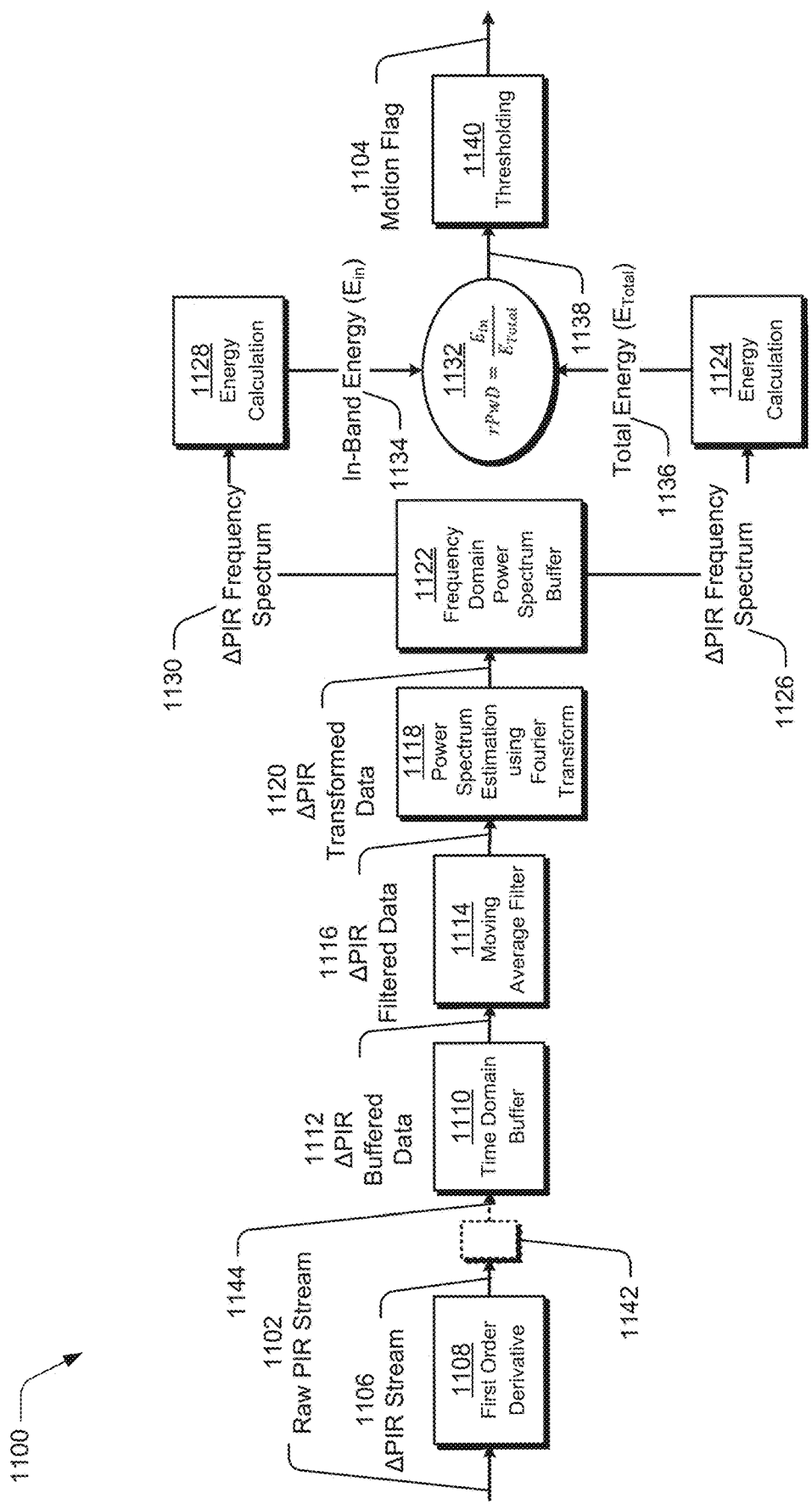
FIG. 11 is a flow diagram of an example representation of a Fourier transform-based technique in accordance with the energy ratio approach for motion detection.

FIG. 11 is a flow diagram of an example representation of a Fourier transform-based technique in accordance with the energy ratio approach for motion detection. A motion detection system 1100 of a building automation system receives raw signal 1102 of a sensor frequency range from a motion sensing component of the building automation system and produces a motion status update 1104 for use by other devices of the building automation system. The raw signal 1102 includes a sensor frequency range representing, for example, the entire frequency of the power spectral density estimate. The motion status update 1104 may be a motion flag, visual indicator, audio indicator, or other type of output usable by a device of the building automation system. In particular, first-order difference signals 1106, or a stream thereof, may be established based on the raw signal 1102 by a first-order derivative component 1108.

The motion detection system 1100 includes Fourier transform components 1110, 1114, 1118, 1112 to change the first-order difference signals 1106 from a time domain to a frequency domain. In particular, the motion detection system 1100 includes a time domain buffer 1110 to store incoming first-order difference signals 1106 and buffered data 1112 may be sampled from the time domain buffer. For some embodiments, the motion detection system 1100 may include a moving average filter 1114, which is a low pass filter for smoothing the first-order difference signals and/or averaging a sample of the buffered data 1112 to produce an average value, i.e., filtered data. An example of the moving average filter 1114 is, but is not limited to, a finite impulse response low pass filter.

The motion detection system 1100 includes a power spectrum estimation, using Fourier transform, component 1118 to receive the buffered data 1112 or the filtered data 1116 and generate transformed data 1120 based on the received buffered or filtered data. The power spectrum estimation component 1118 is configured to transform incoming data based on time-domain to outgoing data based on frequency domain. The transformed data 1120 generated by the power spectrum estimation component 1118 is received and stored at a frequency domain buffer 1122.

The motion detection system 1100 includes energy ratio components 1124, 1128, 1132 to generate an energy ratio based on the incoming transformed data 1120 stored at the frequency domain power spectrum buffer 1122. For identifying total energy, the transformed data 1120 may be sampled from the frequency domain power spectrum buffer 1122 to provide a buffered set, namely the frequency spectrum 1126, of the transformed data 1120 to a total energy calculation component 1124. The total energy calculation component 1124 sums the total energy 1136 identified across the sensor frequency range including energy above and below the particular frequency threshold 810. For identifying in-band energy, the transformed data 1120 may be sampled from the frequency domain power spectrum buffer 1122 to provide a buffered set, namely the frequency spectrum 1130, of the transformed data 1120 to an in-band energy calculation component 1128. The in-band energy calculation component 1128 sums the in-band energy 1134 identified by a motion band 812 of the frequency below the particular frequency threshold 810.

An energy ratio component 1132, based on the in-band energy 1134 and the total energy 1136, determines the energy ratio 1138, i.e., rPwD. For example, the energy ratio 1138 may be determine by a simple division of the in-band energy 1134 by the total energy 1136. The energy ratio 1138 may then be compared to a predetermined ratio threshold to determine whether or not motion is detected or is not detected. As described above, the predetermined ratio threshold may be a rPwD value between a known detected motion value and a known no detected motion value. A thresholding component 1140 of the motion detection system may generate the motion status update 1104 in response to determining that the ratio meets or exceeds a predetermined ratio threshold.

It is to be noted that various techniques may be implemented to enhance the operations of the motion detecting systems describe herein. Specifically, the techniques of scaling and randomization of the sensor buffer, sample skipping for radio transmission interference, and dead zone shifting are described. Also, two or more of these techniques may be combined for further enhancement of the operations of these motion detecting systems. Referring to the motion detecting system 1100 of FIG. 11, one or two other techniques 1142 may be added before the Fourier transform components 1110, 1114, 1118, 1122 to generate input 1144 to the Fourier transform components. For one embodiment, the technique 1142 may be the dead zone shifting technique described above with reference to FIG. 6. For another embodiment, the technique 1142 may be the sample shifting technique described above with reference to FIG. 5. For yet another embodiment, the technique 1142 may be a combination of the dead zone shifting technique and the scaling and randomization technique described above in reference to FIG. 4. For still another embodiment, the technique 1142 may be a combination of the sample shifting technique and the scaling and randomization technique.

Figure 12:
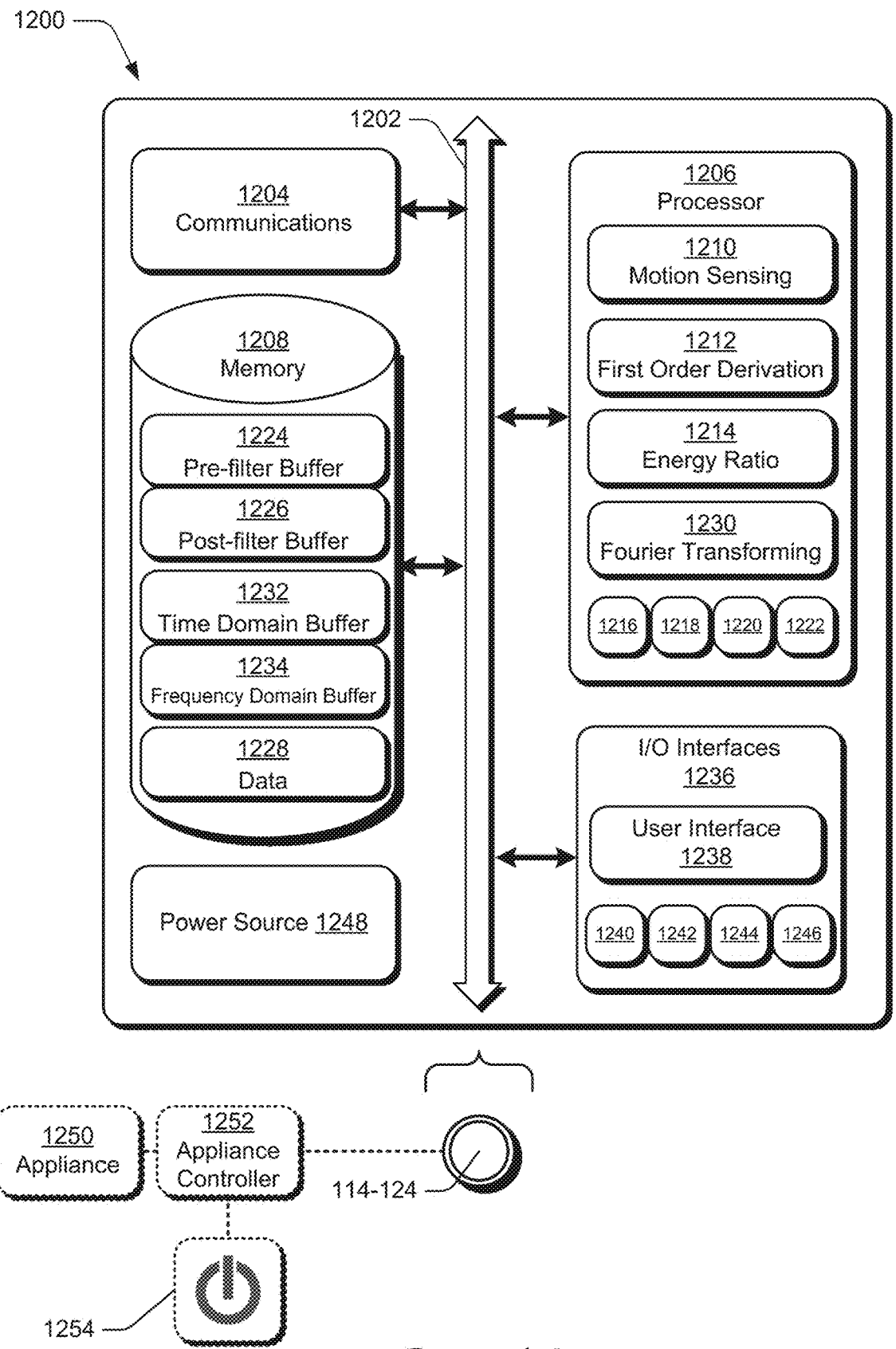
FIG. 12 is a block diagram of an example representation of various components of a motion sensor in accordance with the energy ratio approach for motion detection.

FIG. 12 represents example device components 1200 of the motion sensor 114-124 of the building automation system in accordance with the energy ratio approach for motion detection. An example of a motion sensor 114-124 includes, but is not limited to, an infrared sensor (such as a passive infrared sensor), ultrasonic sensor, microwave sensor, tomographic sensor, device having a combination of motion sensing technologies, and any other type of sensor having the capability to notice moving objects, including people, and/or determine occupancy. The device components 1200 of the motion sensor 114-124 comprise a communication bus 1202 for interconnecting the other device components directly or indirectly, one or more communication components 1204 communicating other entities via a wired or wireless network, one or more processors 1206, and one or more memory components 1208. The communication component 1204 may utilize wireless technology for communication, such as, but are not limited to, Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. The communication component 1204 of the device components 1200 may also utilize wired technology for communication, such as transmission of data over a physical conduit, e.g., an electrical cable or optical fiber cable.

The one or more processors 1206 may execute code and process data received at other components of the device components 1200, such as information received at the communication component 1204 or stored at the memory component 1208. The code associated with the building automation system and stored by the memory component 1208 may include, but is not limited to, operating systems, applications, modules, drivers, and the like. An operating system includes executable code that controls basic functions of the motion sensor 114-124, such as interactions among the various components of the device components 1200, communication with external devices via the communication component 1204, and storage and retrieval of code and data to and from the memory component 1208. Each application includes executable code to provide specific functionality for the processor 1206 and/or remaining components of the motion sensor 114-124. Examples of applications executable by the processor 1206 include, but are not limited to, a motion sensing module 1210, a first-order derivation module 1212, an energy ratio module 1214, and/or enhancement modules 1216-1222. The enhancement modules include a scaling and randomization module 1216, sample skipping module 1218, dead zone shifting module 1220, and buffer windowing module 1222. It is to be understood that one or more modules of the processor or processors 1206 may be co-located with, or separate from, other modules. For example, the motion sensing module 1210, or a portion thereof, may be located at a processor separate from another processor of one or more other modules 1210-1222. Data is information that may be referenced and/or manipulated by an operating system or application for performing functions of the motion sensor 114-124. Examples of data associated with the building automation system 100 and stored by the memory component 1208 may include, but are not limited to, a pre-filter or non-filtered buffer 1224, a post-filter or filtered buffer 1226, and/or general data 1228 such as a particular frequency threshold and a predetermined ratio threshold.

For another embodiment, such as the energy ratio technique using Fourier transformation, examples of applications executable by the processor 1206 may include, but are not limited to, a Fourier transforming module 1230 in addition to, or in place of, one or more modules described for the embodiments above. Examples of data associated with the building automation system 100 and stored by the memory component 1208 may include, but are not limited to, a time domain buffer 1232 and a frequency domain buffer 1234 in addition to, or in place of, the non-filtered buffer 1224 and the filtered buffer 1226 described for the embodiments above. It is to be understood the buffers described herein may be similar or different and they may be together or separate. For example, non-filtered buffer 1224, filtered buffer 1226, time domain buffer 1232, and/or frequency domain buffer 1234 may be memory blocks in the memory component 1208 for some embodiments; one or more buffers may be in a different memory component separate from the memory component 1208 for some other embodiments.

The device components 1200 of each motion sensor 114-124 may further comprise one or more input and/or output components (I/O interfaces) 1236. The I/O interfaces 1236 of the device components 1200 may include one or more visual 1240, audio 1242, mechanical 1244, and/or other components 1246. The I/O interfaces 1236 of each motion sensor 114-124 may comprise a user interface 1238 for interaction with a user of the motion sensor 114-124. The user interface 1238 may include a combination of hardware and software to provide a user with a desired user experience. For example, the user interface 1238 may include one or more input components to allow the user to enter information and one or more output components to provide information to the user.

The device components 1200 may further comprise a power source 1248, such as a power supply or a portable battery, for providing power to the other device components 1200 of each motion sensor 114-124 of the building automation system 100. For some embodiments, the motion sensor 114-124 may also operate with an appliance 1250, such as a light fixture 104-108. For other embodiments, in order to operate with the appliance 1250, the motion sensor may be coupled to an appliance controller 1252 that interfaces with the appliance 1250 and allows the motion sensor to control one or more functions of the appliance 1250. For still other embodiments, the appliance controller 1252 may also couple to a power source 1254 to provide power to the motion sensor, the appliance 1250, and/or itself.

It is to be understood that FIG. 12 is provided for illustrative purposes only to represent examples of the device components 1200 of a motion sensor 114-124 and is not intended to be a complete diagram of the various components that may be utilized by the device. Therefore, motion sensor 114-124 may include various other components not shown in FIG. 10, may include a combination of two or more components, or a division of a particular component into two or more separate components, and still be within the scope of the present invention.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A motion detection system of a building automation system comprising:
   a motion sensing component configured to generate a raw signal; and
   a processor configured to establish first-order difference signals based on the raw signal, identify in-band energy in a motion portion of a sensor frequency range based on the first-order difference signals, identify total energy in the sensor frequency range based on the first-order difference signals, determine a ratio of the in-band energy and the total energy, and generate a motion status update in response to determining that the ratio meets or exceeds a predetermined ratio threshold,
   wherein the processor is further configured to identify the in-band energy by summing a first plurality of frequency components of the first-order difference signals below a predetermined in-band threshold of the sensor frequency range, and identify the total energy by summing a second plurality of frequency components of the first-order difference signals across the sensor frequency range.

2. The motion detection system as described in claim 1, wherein the second plurality of frequency components is greater than the first plurality of frequency components.

3. The motion detection system as described in claim 1, wherein:
   the processor is further configured to generate sensor frequency components in a frequency domain based on the first-order difference signal signals using a Fourier transform; and
   the sensor frequency components in the frequency domain include the first plurality of frequency components and the second plurality of frequency components.

4. The motion detection system as described in claim 3, further comprising a buffer to store the sensor frequency components in the frequency domain in a buffer; and
   sampling a set of the sensor frequency components in the frequency domain by an energy calculation component.

5. The motion detection system as described in claim 1, wherein the processor is further configured to perform a Fourier transform on a complex signal of a partial length of input samples.

6. The motion detection system as described in claim 1, wherein:
   the processor is further configured to apply dead zone shifting to the first-order difference signals in response to an interference transmission; and
   the processor applies the dead zone shifting to the first-order difference signals by reducing larger values of the first-order difference signals and suppressing smaller values of the first-order difference signals.

7. The motion detection system as described in claim 1, wherein the processor is further configured to scale the plurality of frequency components by a predetermined scale value and modify randomly the plurality of frequency components in response to at least one of a ratio, a half size, or a mode.

8. The motion detection system as described in claim 1, further comprising;
   a buffer to store the first-order difference signals, wherein the first-order difference signals are in a time domain; and
   a moving average filter to sample a set of the first-order difference signals.

9. A method for a motion detection system of a building automation system, the method comprising:

receiving raw signal from a motion sensing component of the building automation system;

establishing first-order difference signals based on the raw signal;

identifying in-band energy in a motion portion of a sensor frequency range based on the first-order difference signals, identifying the in-band energy including summing a first plurality of frequency components of the first-order difference signals below a predetermined in-band threshold of the sensor frequency range;

identifying total energy in the sensor frequency range based on the first-order difference signals, identifying the total energy includes summing a second plurality of frequency components of the first-order difference signals across the sensor frequency range;

determining a ratio of the in-band energy and the total energy; and generating a motion status update in response to determining that the ratio meets or exceeds a predetermined ratio threshold.

10. The method as described in claim 9, wherein the second plurality of frequency components is greater than the first plurality of frequency components.

11. The method as described in claim 9, further comprising generating sensor frequency components in a frequency domain based on the first-order difference signals using a Fourier transform, wherein the sensor frequency components in the frequency domain include the first plurality of frequency components and the second plurality of frequency components.

12. The method as described in claim 11, further comprising:

storing the sensor frequency components in the frequency domain in a buffer; and sampling a set of the sensor frequency components in the frequency domain by an energy calculation component.

13. The method as described in claim 9, further comprising generating sensor frequency components based on the first-order difference signals using a Fourier transform, wherein generating the sensor frequency components includes performing the Fourier transform on a complex signal of a partial length of input samples.

14. The method as described in claim 9, further comprising applying dead zone shifting to the first-order difference signals in response to an interference transmission, wherein applying the dead zone shifting to the first-order difference signals includes reducing larger values of the first-order difference signals and suppressing smaller values of the first-order difference signals.

15. The method as described in claim 9, further comprising:

scaling the plurality of frequency components by a predetermined scale value; and modifying randomly the plurality of frequency components in response to at least one of a ratio, a half size, or a mode.

16. The method as described in claim 9, further comprising;

storing the first-order difference signals in a buffer, wherein the first-order difference signals are in a time domain; and sampling a set of the first-order difference signals by a moving average filter.

\* \* \* \* \*